March 31, 1931.    G. A. BURNHAM    1,798,365
PROTECTIVE SYSTEM AND APPARATUS
Filed April 16, 1928
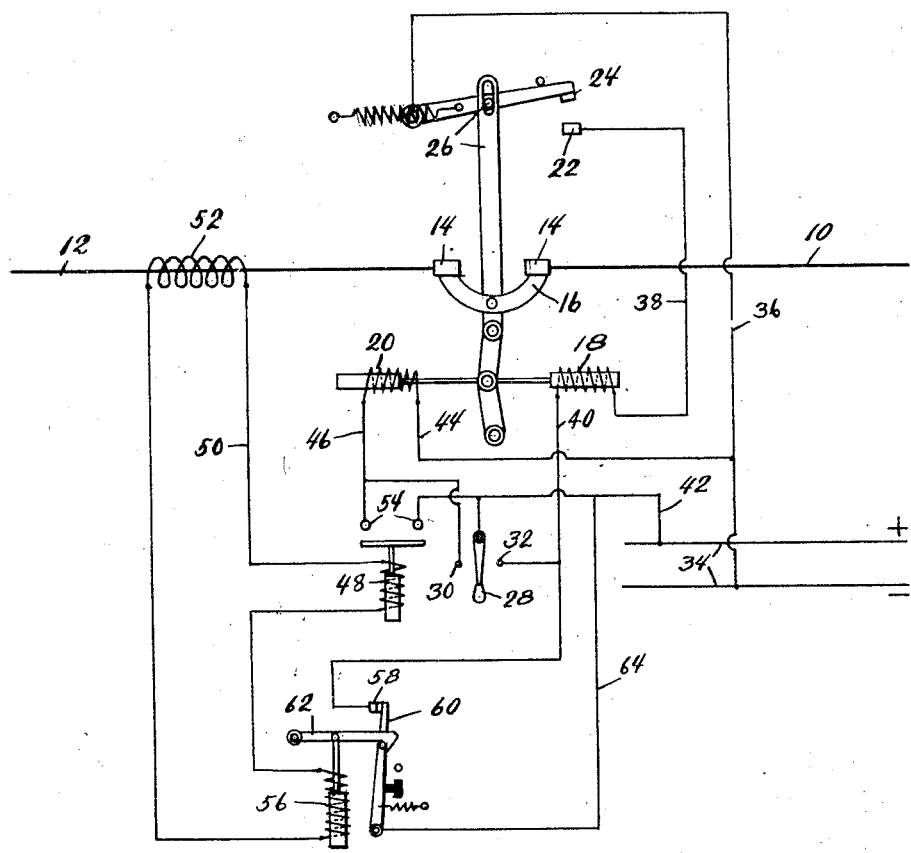
Inventor.
George Burnham Patented Mar. 31, 1931

1,798,365

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

PROTECTIVE SYSTEM AND APPARATUS

Application filed April 16, 1928. Serial No. 270,211.

This invention relates to electrical distribution systems and to methods and apparatus for protecting the system against faults thereon.

Trouble on a distribution system can cause either a very heavy overload current, approximating a short circuit current, or a relatively light overload current. A fault causing a heavy or short circuit current is usually of a more or less permanent nature and the line can not be cleared of the fault by any known method of manipulating the switches of the line. A fault that causes a moderate overload current may be of a temporary nature as, for instance, a flash-over arc across an insulator or a branch of a tree or other semi-conducting object across the line.

Heretofore it has been proposed to clear the line of flash-over arcs or so-called "arcing grounds" by opening and closing the switch in the line rapidly and repeatedly under the theory that an arc on the line would be extinguished during the momentary period that the switch was open and the line was without potential and that a branch of a tree or other semi-conductor would be burned off by the successive momentary periods of energization of the line.

A protective system arranged to function in this manner, however, can not discriminate between temporary faults and permanent faults, or those that cause practically a short circuit current to traverse the line. Thus the system will cause the switch to open and reclose repeatedly against a heavy short circuit current. This is highly undesirable since it can cause heavy surges to be set upon the line, do damage to the apparatus thereon and also cause damage to the switch. It is an object of the present invention to provide a method of protecting an electric distribution system against faults, which method consists in discriminating between a temporary fault and a permanent fault, and operating the switch of the system in accordance with the type of fault on the system.

A further object is a method of protecting an electric distribution system against faults thereon which consists in repeatedly opening and closing the switch of the system if the fault causes a moderate overload to traverse the line and to hold the switch open after its first opening and prevent its reclosing if the overload on the line is heavy or the fault is of a permanent nature.

A further object is a method of protecting the system against faults which consists in repeatedly opening and reclosing the switch against a fault which is of a nature to produce a moderate overload current in the system and to hold the switch open and prevent the reclosing thereof if and when the light current fault degenerates into a heavy current fault.

A further object is the provision of apparatus and systems to perform the above stated objects.

A yet further object is generally to improve upon protective systems for electric distribution systems.

The figure is a diagrammatic representation of a single conductor of an electric distribution system and protective apparatus therefor arranged in accordance with this invention.

As here shown, the electric distribution system with which the present invention is associated comprises two sections 10 and 12 which are connected to the terminals 14 of an electric switch or circuit interrupter having the movable bridging member 16, including the tripping or opening coil 20. The circuit interrupter is provided with an auxiliary switch having a fixed contact 22 and a movable contact 24 and connected with the operating mechanism of the interrupter by suitable means as the lost-motion connection 26. The auxiliary switch is so arranged that it closes its contacts when the interrupter is about in open position and opens its contact when the interrupter is about in closed position.

The interrupter can be opened and closed manually by a circuit controller having the movable contact member 28, the fixed contact member 30 cooperating with the movable contact member to energize the opening coil 20 and open the switch, and the fixed contact member 32 cooperating with the movable contact member to energize the closing coil 18 and close the interrupter. Power for energizing the opening and closing coils is derived from the station power buses 34. The auxiliary switch of the circuit interrupter is included in series with the closing coil 18 by means of the conductors 36 and 38. The conductor 36 is connected with one of the station buses and the conductor 38 that is connected with one of the terminals of the closing coils is adapted to be connected with the other of the station buses through the contact members 28 and 32 of the manually operated circuit controller and the conductor 42. One terminal of the opening coil is connected with one of the station buses 34 and the other terminal of the opening coil is connected to the other of the station buses through the conductor 46, the contact members 28 and 30 of the circuit controller, and the conductor 42. Thus when the circuit controller is moved to the left, the opening coil is energized and when the circuit controller is moved to the right, the closing coil is energized.

In accordance with this invention, means are provided to effect the repeated opening and closing of the interrupter on light overloads, thus to attempt to remove what may be a temporary fault on the distribution system, as the section 12, to maintain the interrupter open when the fault degenerates into one of a heavy overload or permanent nature, and to prevent the reclosing of the switch when it first opens if the overload is heavy or the fault is of a permanent nature. To this end, a relay 48 is energized through conductors 50 from a current transformer 52 deriving its energy from the current in the section 12 of the distribution system. The relay is set to operate at a light overload and to bridge its contact members 54 which are in series with the conductors 46 and 42 of the opening coil circuit, thus to open the interrupter. The current transformer also energizes the coil 56 of a lockout relay which is set to operate at a heavy overload in the distribution system, as an overload approximately a short circuit.

Said lock-out relay is provided with normally engaged stationary and movable contact members 58 and 60. The movable contact member 60 is biased for opening movement. Said movable contact member is held in circuit closed position by a latch 62 which is adapted to be raised when the coil 56 is sufficiently energized thus to effect the separation of the contacts 58 and 60. The movable contact member 60 is adapted to remain in circuit open position until reset manually or in some other suitable manner. The contact member 58 is connected with the conductor 40 of the closing coil and the movable contact member 60 is connected through a conductor 64 with the conductor 42. The contact members of the relay are thus in series with the closing coil 18.

The operation is essentially as follows: If there is a light overload on the line, the relay 48 operates to energize the opening coil 20 and open the interrupter. When the interrupter is in open position, the contacts 22, 24 of the auxiliary switch are closed and thus energize the closing coil 18 and effect the reclosing of the switch. If during the open period of the switch the fault on the circuit disappears the switch will remain closed after it closes. If, however, the light fault still exists, the relay 48 again opens the interrupter. The interrupter will again close and it will be repeatedly opened and closed for so long as the light load persists on the system.

If the fault that occasions the operation of the relay 48 is of a temporary nature, as due to a flashover arc, or to the bridging of the conductors of the system by a branch of a tree, or the like, the arc will go out during one of the periods that the interrupter is open or the branch will be burned off during one of the momentary periods that the interrupter is closed. Thus after a few opening and closing operations of the interrupter the fault will disappear and the interrupter when next closed and with a normal load on the line will remain closed until trouble again develops.

If, however, after a few operations of the interrupter the light fault degenerates into a fault of a permanent nature or one that causes a heavy overload current to traverse the system the lock-out relay 56 will be energized and its contact members 58 and 60 will be separated. The closing coil 18 of the interrupter thus can not be energized and the interrupter will stay open until the protective system is reset manually. If the overload current immediately at the beginning is of a high value the relay 56 will operate immediately and open the closing coil circuit so that the interrupter can not be reclosed after the relay 48 has operated to open it. Thus the interrupter is caused to stay open whenever a heavy overload traverses the distribution system.

Preferably, although not necessary, the interrupter opens and closes so rapidly that synchronous apparatus connected to the system does not fall out of synchronism. The invention herein described and claimed is also described but not claimed in my concurrently filed application, Serial No. 270,212.

I claim:

1. An electric distribution system having a circuit interrupter in the circuit thereof, means to open and close the interrupter repeatedly and indefinitely when a light overload current traverses the system, and means to open the interrupter and maintain it permanently open when a heavy overload traverses the system.

2. An electric distribution system having a circuit interrupter in the circuit thereof, automatic means to open and close the interrupter repeatedly and indefinitely when a light overload current traverses the system, and means to open the interrupter immediately upon the occurrence of a heavy overload on the system and to prevent the automatic reclosing of the interrupter.

3. A distribution circuit including the combination of a circuit interrupter having opening and closing circuits, means for repeatedly and indefinitely energizing the closing circuit in response to opening of the interrupter when a light overload traverses the circuit of the interrupter, and means for opening and permanently maintaining open the closing circuit of the interrupter when a heavy overload traverses the circuit of the interrupter.

4. A circuit interrupter having opening and closing circuits, a relay operable when a light overload current traverses the circuit of the interrupter to repeatedly and indefinitely energize the closing circuit of the interrupter in response to successive tripping operations thereof, and a lock-out relay energized when a heavy overload traverses the circuit of the interrupter until said relay is reset by hand to maintain open the closing circuit of the interrupter.

In testimony whereof, I have signed my name to this specification.

GEORGE A. BURNHAM.